United States Patent

Paige

[15] 3,678,305

[45] July 18, 1972

[54] ACOUSTIC SURFACE WAVE DEVICES

[72] Inventor: Edward George Sydney Paige, Malvern, England

[73] Assignee: Minister of Aviation Supply in Her Britannic Majesty's Government of the United Kingdom of Great Britain and Northern Ireland, London, England

[22] Filed: Feb. 5, 1971

[21] Appl. No.: 113,010

[30] Foreign Application Priority Data

Feb. 6, 1970 Great Britain ........................ 5,732/70

[52] U.S. Cl. ................................ 310/8.1, 310/9.5, 310/9.8, 330/5.5, 333/30

[51] Int. Cl. ................................ H01v 7/00

[58] Field of Search ........................ 310/8, 8.1, 9.5, 9.7, 9.8, 310/8.2; 317/235 AG, 235 AH, 246; 333/30, 72; 330/5, 5.5; 315/3.5

[56] References Cited

UNITED STATES PATENTS

| | | | |
|---|---|---|---|
| 3,360,749 | 12/1967 | Sittig | 333/30 |
| 3,479,572 | 11/1969 | Pokoony | 333/30 |
| 3,568,079 | 3/1971 | Yoder | 333/30 |
| 3,142,027 | 7/1964 | Albsmeier et al. | 333/72 |
| 3,573,673 | 4/1971 | DeVries | 333/30 |
| 3,500,461 | 3/1970 | Epstein et al. | 333/30 |

OTHER PUBLICATIONS

J. deKlerk, " Ultrasonic Transducers, 3. Surface Wave Transducers," Ultrasonics, January 1971, pp 35–48.

*Primary Examiner*—J. V. Truhe
*Assistant Examiner*—B. A. Reynolds
*Attorney*—Hall, Pollock & Vande Sande

[57] ABSTRACT

An acoustic surface wave device relies on its effectiveness not on the piezoelectric effect but on the electrostrictive effect whereby the effectiveness of the device is electric field dependent.

11 Claims, 10 Drawing Figures

ACOUSTIC SURFACE WAVE DEVICES

BACKGROUND OF THE INVENTION

The present invention relates to acoustic surface wave devices.

Acoustic surface waves on piezoelectric media are accompanied by electric fields. These fields can cause currents to flow in metals or semiconducting materials adjacent or close to the surface on which the wave is propagating. This interaction is responsible for the operation of various known surface wave components, for example interdigital comb transducers and acoustic surface wave amplifiers.

The present invention concerns a similar class of components but instead of the electric fields accompanying an acoustic surface wave arising from the piezoelectric effect it arises from the electrostrictive effect of a crystal in an electrostatic potential gradient.

SUMMARY OF THE INVENTION

According to the present invention there is provided an acoustic surface wave device including a body of material which has electrostrictive constants and piezoelectric constants such that for an acoustic surface wave travelling in a first given direction and an electric field applied in a second given direction the piezoelectric effect is negligible. The device further includes means for applying an electric field to the body of material in the second given direction. The electric field so applied may be variable.

The elements of the stress tensor $\underline{\underline{T}}$ in a crystal due to an electric field $\underline{E}$ are given by the equation $$T_{jk} = e_{ijk}E_i + \tfrac{1}{2}g_{iljk}E_iE_l + \ldots\ldots \quad 1$$

where $e_{ijk}$ and $g_{iljk}$ are elements of the piezoelectric and electrostrictive tensors respectively, and the summation convention is adopted whereby the sum is automatically taken over any suffix which occurs twice in any product. Contributions from strain are not considered here. If the local electric field consists of a contribution $\underline{E}_1$ from an acoustic surface wave and a contribution $\underline{E}_0$ from an externally applied electrostatic potential gradient, so that $$\underline{E} = \underline{E}_0 + \underline{E}_1, \quad \ldots\ldots (2)$$

and if, further, $$E_1 << E_0, \quad \ldots\ldots (3)$$

then to a first order of approximation $$T_{jk} = e_{ijk}(E_{0i} + E_{1i}) + \tfrac{1}{2}g_{iljk}(E_{0i}E_{01} + 2E_{0i}E_{1i}), \quad \ldots\ldots (4)$$

since $g_{iljk} = g_{iljk}$. The stress $T_0$ due to the electrostatic potential gradient $E_0$ and the stress $T_1$ due to the acoustic surface wave $\underline{E}_1$ are then given by $$T_{0jk} = e_{ijk}E_{0i} + \tfrac{1}{2}g_{iljk}E_{0i}E_{01} \quad \ldots\ldots (5)$$

and $$T_{1jk} = (e_{ijk} + g_{iljk}E_{01})E1i. \quad \ldots\ldots (6)$$

Thus the non-piezoelectric but electrostrictive material in a field $E_0$ behaves as if it were piezoelectric material with effective piezoelectric tensor elements $e_{ijk}(eff)$ given by $$e_{ijk}(eff) = g_{iljk}E_{01}. \quad \ldots\ldots (7)$$

In other words the material behaves like a material in which the effective piezoelectric constant may be continuously varied by means of an externally applied voltage.

All materials are electrostrictive to a greater or lesser extent, but for the majority the effect is small. There are materials in which the effect is appreciable, for example ferro-electric materials near their Curie temperature, such as tri-glycine sulphate or KTN (potassium tantalum niobate). The invention can be applied to materials which have an appreciable electrostrictive constant but are non-piezoelectric and also to materials which are piezoelectric but by choice of orientations of field, crystal directions and surface wave have a piezoelectric constant zero or so small as to be negligible. Materials to which the invention may be applied will be referred to hereinafter as ES materials.

BRIEF DESCRIPTION OF THE DRAWINGS

An embodiment of the invention will be described by way of example with reference to the accompanying drawings, in which.

DESCRIPTION OF THE PREFERRED EMBODIMENTS

Figures 1, 2:
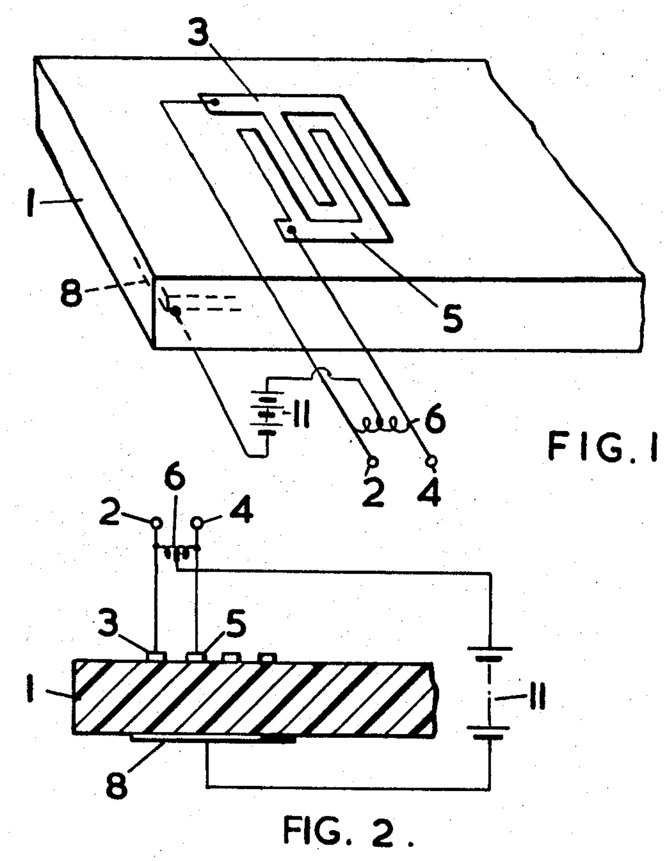
FIG. 1 is a perspective view and FIG. 2 is a cross-sectional diagram of an interdigital comb transducer.

FIG. 1 is a perspective view and FIG. 2 is a cross-sectional diagram of an interdigital comb transducer. A body of material 1 has a plane surface on which are deposited a first conducting electrode 3 in the form of a comb and a second conducting electrode 5 also in the form of a comb so arranged that the fingers of the two combs are disposed alternately beside one another. The electrode 3 is connected to a terminal 2 and the electrode 5 is connected to a terminal 4. An inductor 6 may be connected between the terminals 2 and 4 to act as the inductor in an LC tuned circuit having the inter-electrode capacitance as its capacitor.

In known interdigital comb transducers the material on which the body 1 is made is piezoelectric and the distance between adjacent fingers of an electrode such as 3 is the wavelength in the surface of the acoustic surface wave. The phase velocity of the acoustic surface wave is some $3 \times 10^5$cms per second, and so for a surface wave of a frequency of 100 MHz the distance between adjacent fingers of an electrode such as the electrode 3 is some 30 microns. Using such a transducer an acoustic surface wave may be propagated by connecting an oscillator of the appropriate frequency between the terminals 2 and 4, and a detector of acoustic surface waves may be built by connecting a receiver between the terminals 2 and 4.

The interdigital comb transducer embodying the invention has the body 1 made of a piece of ES material having plane parallel opposing faces. A further conducting electrode 8 is deposited on the face opposing that on which the electrodes 3 and 5 are deposited. As a further example, the electrode 8 may be a conducting substrate on which the body 1 is deposited. A direct voltage source 11 is connected between the electrode 8 and a center tap on the inductor 6.

The action of the device is as follows. The voltage source 11 provides a direct electric field $\underline{E}_0$ as in equation (2) above. In this case the electric field is applied in a direction perpendicular to the path of the acoustic surface wave. Thus the device acts as an interdigital comb transducer having an enhanced piezoelectric constant $e_{ijk} + g_{iljk}E_{01}$ or, since the relevant piezoelectric effects in ES material are negligible, $g_{iljk}E_{01}$.

It is to be noted that since the effective piezoelectric constant $\underline{e}_{eff}$ is dependent upon the applied field $\underline{E}_0$, it can be varied by varying the applied field. By this means the acoustic surface wave being launched by the interdigital comb transducer may be modulated. Similarly if the interdigital comb transducer is a receiving transducer (a tap on a delay line for example) it can be rendered inactive by reducing the applied field $\underline{E}_0$ to zero and reactivated at will by applying a non-zero voltage.

A problem that is known with conventional delay lines is that of triple transit signals, which occur by the reflection of a portion of the original signal at the output transducer and again at the input transducer. The signal reappears at the output transducer having had three times the correct delay. The invention provides a method of suppressing a triple transit pulsed signal by activating the input transducer only at the time that a signal is to be launched into the delay line. Then when a fraction of the signal which has been reflected from the output transducer reappears at the input transducer the input transducer will be inactive and the signal will be propagated through the input transducer without reflection.

Figure 3:
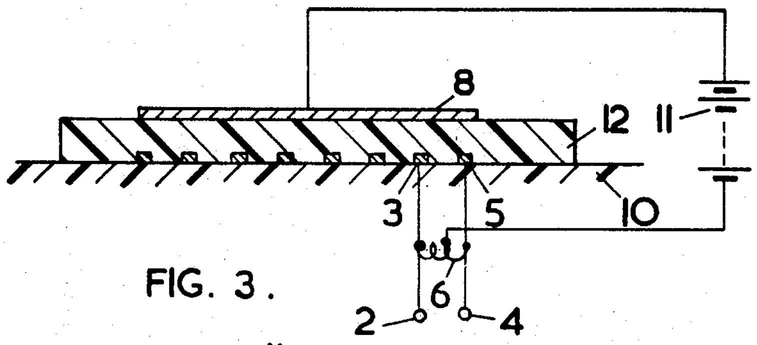
FIG. 3 is a cross-sectional diagram of an alternative interdigital comb transducer.

FIG. 3 is a cross-sectional diagram of an alternative interdigital comb transducer. Interdigital comb electrodes 3 and 5 similar to the electrodes 3 and 5 in FIG. 1 are deposited on a substrate 10 of non-piezoelectric, non-ES material. A film 12 of ES material is deposited on the surface of the substrate 10 over the electrodes 3 and 5. The thickness of the film 12 must be smaller than or comparable with the wavelength in the material of the acoustic surface wave. An electrode 8 is deposited on the surface of the film 12. The electrode 3 is connected to a terminal 2 and the electrode 5 is connected to a terminal 4. An inductor 6 is connected between the terminals 2 and 4 and a voltage source 11 is connected between the electrode 8 and a center-tap on the inductor 6.

The transducer works in a generally similar way to that described above with reference to FIG. 1 and FIG. 2, the field due to the voltage source 11 appearing across the film 12. Since the film 12 is thin, a relatively low voltage will be required to establish a given electric field. Since the thickness of the film 12 is not large compared with the wavelength of the acoustic surface wave, moreover, the acoustic surface wave will penetrate the surface of the substrate 10 and will thus be launched in the surface of the substrate 10. By this means an acoustic surface wave may be launched in the surface of a material which, although having suitable elastic properties, has not the required electrical properties for generating an acoustic surface wave on its own surface by the application of electric signals.

For example, an acoustic surface wave may by this means be made to travel in the surface of a piece of silicon (which may be part of an integrated circuit) or isopaustic glass (i.e., glass in which the time delay is substantially independent of temperature over a reasonable range).

Figure 4:
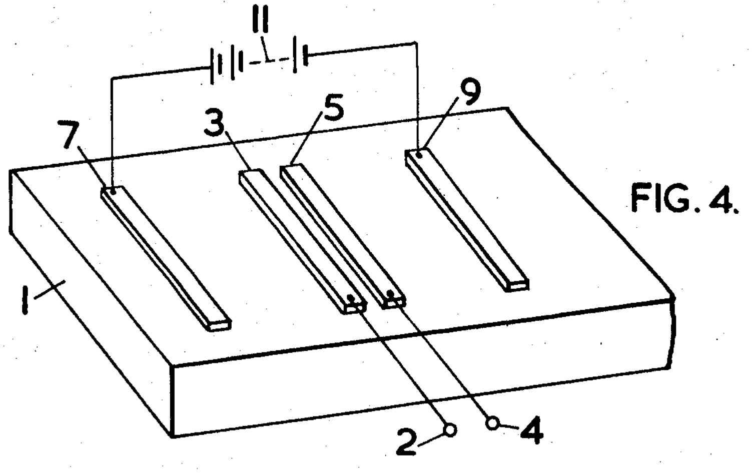
FIG. 4 is a perspective view of a one finger pair transducer.

FIG. 4 is a perspective view of a one finger pair transducer. A body 1 of ES material has a plane surface on which are deposited side by side a first conducting electrode 3 in the form of a single finger and a second conducting electrode 5 also in the form of a single finger disposed adjacent and parallel to the electrode 3. The electrode 3 is connected to a terminal 2 and the electrode 5 is connected to a terminal 4.

Two further conducting electrodes 7 and 9 in the form of single fingers are deposited, one on either side of the electrodes 3 and 5 and parallel to them. A direct voltage source 11 is connected between the electrodes 7 and 9.

The action of the device is as follows. The voltage source 11 provides a direct electric field $\underline{E}_0$ as in equation (2) above. In this case the field is applied in a direction along the path of the acoustic surface wave. Thus the device acts as a one finger pair transducer having an enhanced piezoelectric constant $e_{ijk} + g_{ijh}E_{01}$ or, since the relevant piezoelectric effects in ES material are negligible, $g_{ijh}E_{01}$.

Figure 5:
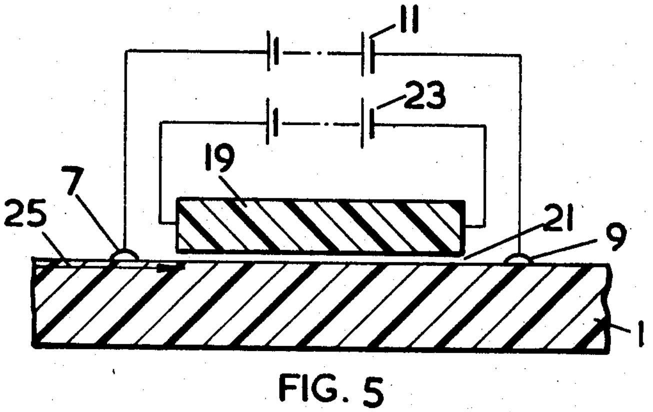
FIG. 5 is a cross-sectional diagram of an acoustic surface wave amplifier.
Figure 6:
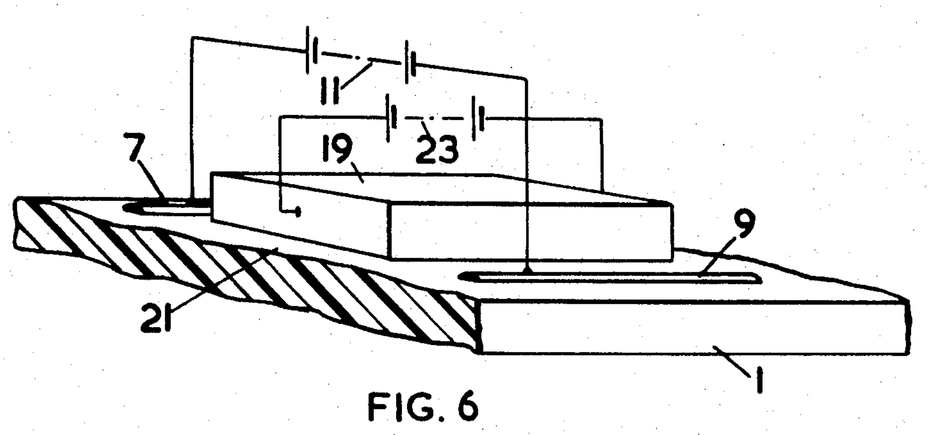
FIG. 6 is a perspective view and FIG. 7 is a diagram, partly in cross-section, of an alternative acoustic surface wave amplifier.
Figure 7:
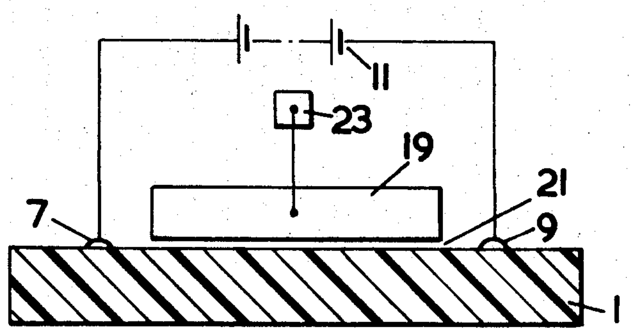

FIG. 5 is a cross-sectional diagram of an acoustic surface wave amplifier, and FIG. 6 is a perspective view and FIG. 7 a diagram partly in cross-section, of an alternative acoustic surface wave amplifier. The body of material 1 carries a body 19 of semiconductor material which is separated from it in known manner by an air gap 21 which is uniform in thickness. A voltage source 23 is connected across the semiconductor 19 to cause an electron drift in the direction of an acoustic surface wave 25 which is to be amplified. In the prior art the material of which the body 1 is made is piezoelectric and the acoustic surface wave 25 picks up energy from the electron drift in the semiconductor body 19, whereby the acoustic surface wave 25 is amplified. If the voltage source 23 is removed, then the acoustic surrace wave has to do work on the free carriers in the semiconductor 19, and is consequently attenuated. The voltage of the source 23 has in general to be adjusted to allow the electron drift velocity in the semiconductor 19 to be greater than that of the acoustic surface wave in order that amplification shall take place.

In the corresponding surface wave amplifier embodying the invention, the body 1 is made of ES material. The two further electrodes 7 and 9 are deposited on the body 1, one on either side of the body 19. In the amplifier illustrated in FIG. 5 the electrodes 7 and 9 are spaced in a direction which is longitudinal to the acoustic surface wave 25 and in the amplifier illustrated in FIG. 6 and FIG. 7 the electrodes 7 and 9 are spaced in a direction which is transverse to the acoustic surface wave 25. The direct voltage source 11 is connected between the electrodes 7 and 9. Therefore when the voltage source 11 is connected, the device works in the same way as a piezoelectric surface wave amplifier. Setting the voltage of the voltage source 11 to zero completely removes the effects of the free carriers in the semiconductor body 19, so that the absorption of power by the system is zero and the semiconductor 19 does not attenuate the acoustic surface wave.

Figure 9:
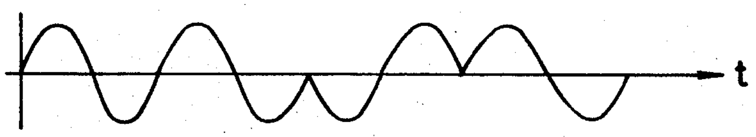
FIG. 9 is a waveform, plotted against time, representative of the output of the coded interdigital comb transducer described with respect to FIG. 8.
Figure 8:
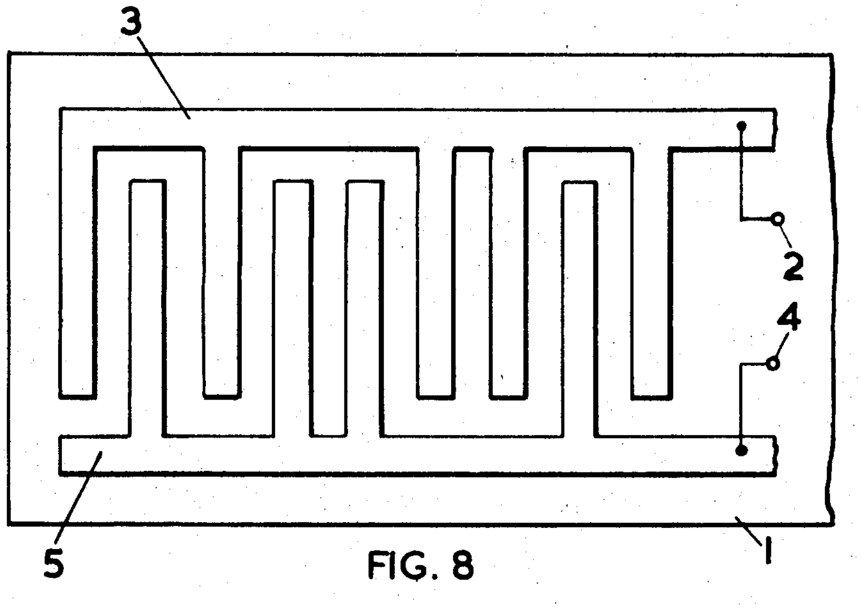
FIG. 8 is a plan view of a known coded interdigital comb transducer.

FIG. 8 is a plan view of a known coded interdigital comb transducer in which a comb electrode 3 is connected to a terminal 2 and a comb electrode 5 is connected to a terminal 4. The terminals 2 and 4 may be input or output terminals. In the transducer shown the fingers of the electrodes 3 and 5 are not alternate, but are arranged in the order 3,5,3,5,5,3,3,5,3, ..., where the digits 3 and 5 refer to fingers belonging to electrodes 3 and 5 respectively. It will be seen that the third pair of fingers has been reversed, so that the transducer will have a maximum response to a signal in which the third full wave has a 180° phase reversal, as is shown in FIG. 9, which is a waveform plotted against time, representative of the output of the interdigital comb transducer. It is clear that this idea is capable of elaboration and a wide variety of coded transducers can be envisaged.

In many applications it would no doubt be desirable not to use a fixed code but a variable code. Clearly this could be achieved in a somewhat cumbersome manner by providing a large number of transducer structures, switching between them as desired. An application of this is found in random phase coded pulse compression.

Now if instead of a body of piezoelectric material a body of ES material is employed, then the variation of the response characteristics of the coded transducer may be achieved electronically, and the necessity for a large number of transducers with switching between them is avoided.

Figure 10:
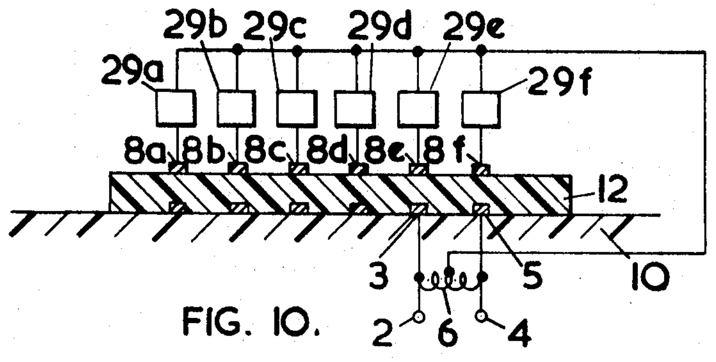
FIG. 10 is a cross-sectional diagram of an alternative variably coded interdigital comb transducer embodying the invention.

FIG. 10 is a cross-sectional diagram of an alternative variably coded interdigital comb transducer embodying the invention. Interdigital comb electrodes 3 and 5 similar to the electrodes 3 and 5 in FIG. 3 are deposited on a substrate 10 of non-piezoelectric, non-ES material. A film 12 of ES material is deposited on the surface of the substrate 10 over the electrodes 3 and 5. The thickness of the film 12 must be smaller than or comparable with the wavelength in the material of the acoustic surface wave. A plurality of electrodes **8*a*, 8*b*, 8*c*, 8*d*, 8*e* and 8*f* is deposited on the surface of the film 12, each electrode 8*a*, 8*b*, 8*c*, 8*d*, 8*e* and 8*f* being either perpendicularly opposite a separate finger of one of the electrodes 3 or 5** or perpendicularly opposite the gaps between the fingers.

The electrode 3 is connected to a terminal 2 and the electrode 5 is connected to a terminal 4. An inductor 6 is connected between the terminals 2 and 4. Several electronic circuits **29*a*, 29*b*, 29*c*, 29*d*, 29*e* and 29*f* are connected separately between a separate one of the electrodes 8*a*, 8*b*, 8*c*, 8*d*, 8*e* and 8*f* and a common terminal, namely a center tap on the inductor 6. The circuits 29***a*, 29*b*, 29*c*, 29*d*, 29*e* and 29*f* are simple reversible voltagedgenerating circuits. The action of the device is as follows. If all the circuits 29*a*, 29*b*, 29*c*, 29*d*, 29*e* and 29*f* are controlled to generate voltages in the same direction then the device acts like that described above with reference to FIG. 3. If now the voltage generated by one of the circuits 29*a*, 29*b*, 29*c*, 29*d*, 29*e* or 29*f* is lowered or switched off then the particular electrode finger opposite to it becomes less effective or ineffective. Furthermore, if one of the circuits 29*a*, 29*b*, 29*c*, 29*d*, 29*e* or 29*f* is reversed then the particular electrode finger opposite to it becomes reversed in effect. It follows that by controlling the electronic circuits 29*a*, 29*b*, 29*c*, 29*d*, 29*e* and 29*f* a variety of signals can be launched or preferentially received by the transducer.

What I claim is:

1. An acoustic surface wave device which relies on its effectiveness on the electrostrictive effect rather than on the piezoelectric effect whereby the effectiveness of the device is electric field dependent, said device comprising a body of material which has electrostrictive constants and piezoelectric constants such that for an acoustic surface wave traveling in a first given direction in said body and an electric field applied to said body in a second given direction the piezoelectric effect is negligible, and means for applying an electric field to the body of material in the second given direction.

2. An acoustic surface wave device as claimed in claim 1 in which the device is a one finger pair transducer.

3. An acoustic surface wave device as claimed in claim 1 in which the device is an interdigital comb transducer.

4. An acoustic surface wave device as claimed in claim 3 in which the means for applying an electric field to the body of material in the second direction includes means for applying variable electric fields to separate portions of the electrodes of said interdigital comb transducer.

5. An acoustic surface wave device as claimed in claim 1 in which the body of material includes a layer of said material on a substrate.

6. An acoustic surface wave device as claimed in claim 5 in which the thickness of said layer is no greater than two wavelengths in the material of an acoustic surface wave, said substrate being made of material which is physically capable of supporting an acoustic surface wave.

7. An acoustic surface wave device as claimed in claim 3 in which the body of material includes a layer of the material on a substrate.

8. An acoustic surface wave device as claimed in claim 7 in which the thickness of said layer is no greater than two wavelengths in the material of an acoustic surface wave, said substrate being made of material which is physically capable of supporting an acoustic surface wave.

9. An acoustic surface wave device as claimed in claim 4 in which the body of material includes a layer of said material on a substrate.

10. An acoustic surface wave device as claimed in claim 9 and in which the thickness of the layer is at most two wavelengths in the material of an acoustic surface wave, said substrate being made of material which is physically capable of supporting an acoustic surface wave.

11. An acoustic surface wave device as claimed in claim 1 and in which which the device is an acoustic surface wave amplifier.

* * * * *